(12) United States Patent
Gibson et al.

(10) Patent No.: US 12,467,773 B2
(45) Date of Patent: Nov. 11, 2025

(54) NODE MOUNTING BRACKET

(71) Applicant: Mueller International, LLC, Atlanta, GA (US)

(72) Inventors: Daryl Lee Gibson, Chattanooga, TN (US); Mohammad Hassan Sobhani, Ontaio (CA); Andrew Wallace, Richmond Hill (CA)

(73) Assignee: Mueller International, LLC, Atlanta, GA (US)

( * ) Notice: Subject to any disclaimer, the term of this patent is extended or adjusted under 35 U.S.C. 154(b) by 431 days.

(21) Appl. No.: 18/129,124

(22) Filed: Mar. 31, 2023

(65) Prior Publication Data

US 2024/0035863 A1 Feb. 1, 2024

Related U.S. Application Data

(60) Provisional application No. 63/393,162, filed on Jul. 28, 2022.

(51) Int. Cl.
| | |
|---|---|
| *G01D 11/30* | (2006.01) |
| *F16M 13/02* | (2006.01) |
| *G01D 7/00* | (2006.01) |
| *G01D 11/24* | (2006.01) |

(52) U.S. Cl.
CPC ............. *G01D 11/30* (2013.01); *F16M 13/02* (2013.01); *G01D 7/00* (2013.01); *G01D 11/245* (2013.01)

(58) Field of Classification Search
CPC ........ G01D 11/30; G01D 7/00; G01D 11/245; F16M 13/02
See application file for complete search history.

(56) References Cited

U.S. PATENT DOCUMENTS

| | | | |
|---|---|---|---|
| 2020/0166386 A1* | 5/2020 | Hoffmann | G01D 11/30 |
| 2022/0073324 A1* | 3/2022 | Sharon | G01D 11/30 |
| 2022/0094244 A1* | 3/2022 | Burghard | G01D 11/24 |
| 2024/0316734 A1* | 9/2024 | Davis | F15B 15/1433 |

FOREIGN PATENT DOCUMENTS

EP 3715795 A1 * 9/2020 ............. H02K 11/21

* cited by examiner

*Primary Examiner* — Jamel E Williams
(74) *Attorney, Agent, or Firm* — Taylor Duma LLP

(57) ABSTRACT

A node mounting bracket for mounting a monitoring node within an access chamber includes a node support portion configured to engage and support the monitoring node; a spring leg extending substantially outward from the node support portion and configured to frictionally engage an inner chamber surface of the access chamber; and a handle extending substantially upward from the node support portion.

23 Claims, 11 Drawing Sheets

NODE MOUNTING BRACKET

CROSS-REFERENCE TO RELATED APPLICATIONS

The present application claims the benefit of U.S. Provisional Application No. 63/393,162, filed Jul. 28, 2022, which is hereby specifically incorporated by reference herein in its entirety.

TECHNICAL FIELD

This disclosure relates to fluid piping systems. More specifically, this disclosure relates to node mounting bracket for mounting a node within an access chamber assembly.

BACKGROUND

Monitoring systems can be installed with fluid piping systems to monitor various utility data. For example, monitoring systems may monitor for leaks in the piping system or may monitor fluid quality or other measurable characteristics. Nodes of the monitoring system can be installed with the piping system. However, the nodes are often difficult to access and remove once installed.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a node mounting bracket for mounting a monitoring node within an access chamber includes a node support portion configured to engage and support the monitoring node; a spring leg extending substantially outward from the node support portion and configured to frictionally engage an inner chamber surface of the access chamber; and a handle extending substantially upward from the node support portion.

Also disclosed is a node assembly mountable within an access chamber, the node assembly comprising a node mounting bracket comprising a spring leg and defining a bracket opening, the spring leg configured to frictionally engage an inner chamber surface of the access chamber; and a monitoring node received through the bracket opening and supported by the node mounting bracket.

Additionally, disclosed is an access chamber assembly comprising an access chamber comprising an inner chamber surface, the inner chamber surface defining a chamber cavity; and a node assembly mounted within the chamber cavity, the node assembly comprising a node mounting bracket comprising a spring leg, the spring leg configured to frictionally engage the inner chamber surface of the access chamber; and a monitoring node mounted to the node mounting bracket.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
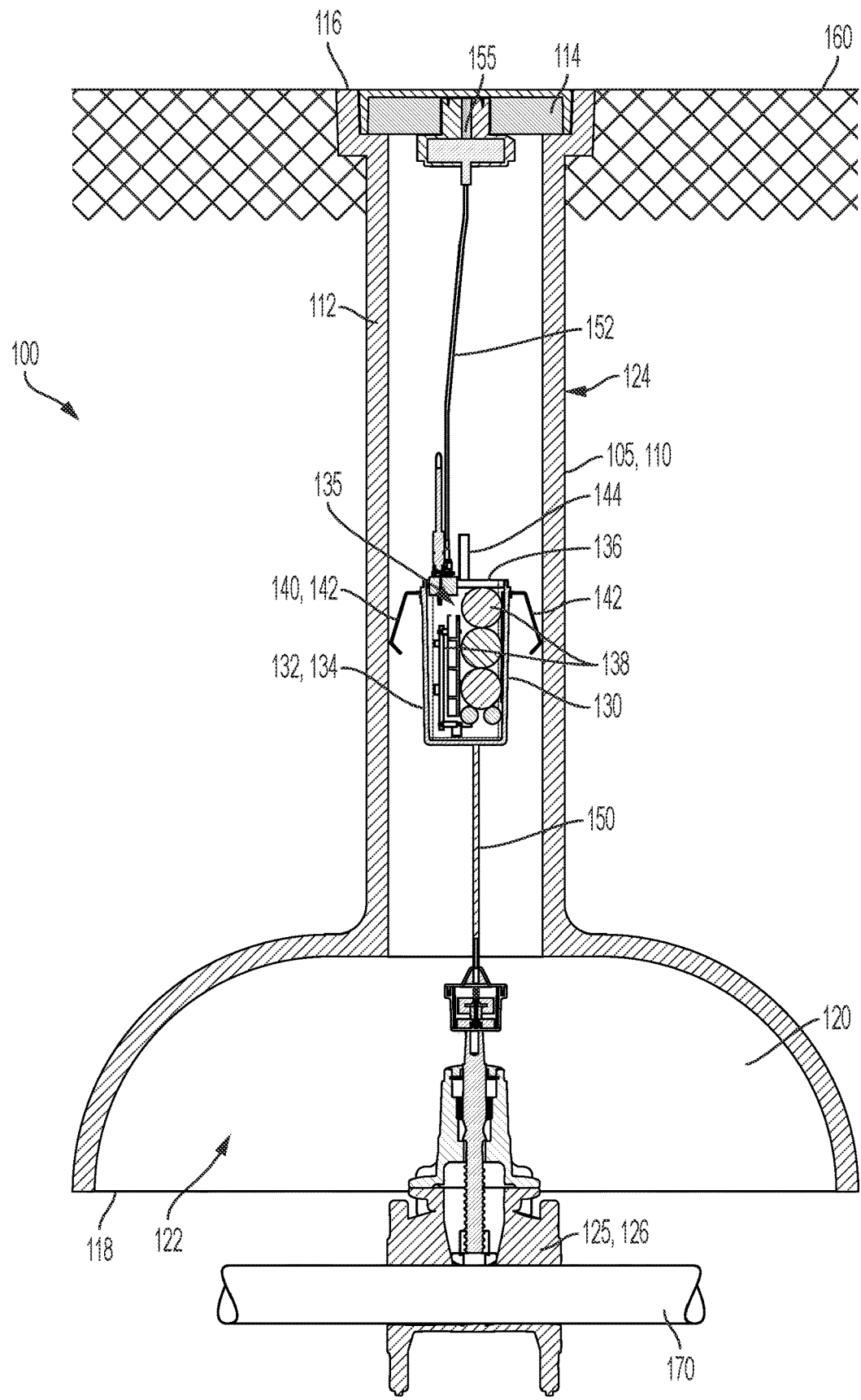
FIG. 1 is a front cross-sectional view of an access chamber assembly comprising a monitoring node mounted therein by a node mounting bracket, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a node mounting bracket and associated methods, systems, devices, and various apparatus. Example aspects of the node mounting bracket can be a spring-loaded bracket. It would be understood by one of skill in the art that the disclosed node mounting bracket is described in but a few exemplary aspects among many. No particular terminology or description should be considered limiting on the disclosure or the scope of any claims issuing therefrom.

FIG. 1 illustrates an access chamber assembly 100 according to an example aspect of the present disclosure. According to example aspects, the access chamber assembly 100 can be connected to any suitable fluid piping system 170, such as a potable water system, for example and without limitation. In other aspects, the fluid piping system 170 can be another type of fluid supply system, a natural gas system, a sewage system, an irrigation network, or the like. The access chamber assembly 100 can comprise an access chamber 105. The access chamber 105 can comprise an access chamber housing 110, which can comprise a chamber liner 112 and a chamber lid 114. The chamber lid 114 can be mounted to the chamber liner 112 at an upper liner end 116 thereof. The chamber liner 112 can define an outer chamber surface 124 and an inner chamber surface 120, and the inner chamber surface 120 can define an internal chamber cavity 122, as shown. The chamber lid 114 can be selectively removable from the chamber liner 112 to allow access to the internal chamber cavity 122 through the upper liner end 116. In the present aspect, the access chamber housing 110 can be installed below-grade (i.e., below ground level 160), and the chamber lid 114 can be about flush with the ground level 160. Other aspects of the access chamber assembly 100 can be installed fully or partially above-grade (i.e., above ground level 160).

The chamber liner 112 and the chamber lid 114 can be formed from a substantially rigid material, such that the components contained within the internal chamber can be sufficiently protected. For example, the chamber liner 112 can be formed from a metal material, such as steel, and the chamber lid 114 can comprise a non-ferrous composite material, as described in further detail below. In other aspects, the chamber liner 112 and/or the chamber lid 114 can be formed from any other suitably rigid material, including, but not limited to, various plastics, various metals, or any suitable combination thereof. In the present aspect, the chamber liner 112 and the chamber lid 114 can be formed from differing materials, while in other aspects, the chamber liner 112 and the chamber lid 114 can be formed from the same material.

In the present aspect, the access chamber assembly 100 can be installed with a valve 125 of the fluid piping system 170, such as a water main valve 126. The water main valve 126 can be any suitable valve 125, including but not limited to, a gate valve, a ball valve, a butterfly valve or the like. The water main valve 126 can be disposed generally at or near a lower liner end 118 of the chamber liner 112. For example, in the present aspect, a portion of the water main valve 126 can be disposed within the internal chamber cavity 122, and another portion of the water main valve 126 can extend beyond the lower liner end 118 to be disposed external to the internal chamber cavity 122. In other aspects, the valve 125 can be disposed fully within the internal chamber cavity 122 or can be disposed fully external to the internal chamber cavity 122.

In example aspects, the fluid piping system 170 can further be equipped with a monitoring system configured to monitor for leaks, fluid pressure, various fluid qualities (e.g., levels of lead, bacteria, PH levels, etc.), or other measurable characteristics or utility data. For example, such monitoring systems are further described in U.S. Provisional Application No. 63/246,857, filed Sep. 22, 2021, U.S. Provisional Application No. 63/392,245, filed Jul. 26, 2022, and U.S.

application Ser. No. 17/949,383, filed Sep. 21, 2022, which are each incorporated by reference in their entirety herein. The monitoring system can comprise one or more monitoring nodes 130, and each monitoring node 130 can comprise various internal monitoring components 138 housed therein, such as, for example and without limitation, a data processor, communication hardware, and a power source (e.g., a battery). In the present aspect, the monitoring node 130 can be equipped with an acoustic sensor(s) that can collect data from the fluid piping system 170 to monitor for leaks. In other aspects, the access chamber assembly 100 can be installed with a meter or other pipeline device from which the monitoring system can obtain utility data.

As shown, one of the monitoring nodes 130 can be mounted within the internal chamber cavity 122 of the access chamber housing 110 between the water main valve 126 and the chamber lid 114. In the present aspect, the monitoring node 130 can be mounted to the inner chamber surface 120 by a node mounting bracket 140. The monitoring node 130 can be communicatively coupled to the water main valve 126 by a valve sensor cable 150. The monitoring node 130 can further be communicatively coupled to an antenna 155 of the monitoring system by an antenna sensor cable(s) 152. In other aspects, the monitoring node 130 can be wirelessly coupled to either or both of the water main valve 126 or the antenna 155.

The antenna 155 can be configured to wirelessly transmit information related to the utility data obtained by the monitoring system to a third party or an external device (e.g., an operations center, a computer, a phone, etc.). In the present aspect, the antenna 155 can be disposed within the internal chamber cavity 122 and can be mounted to the chamber lid 114. In other aspects, the antenna 155 can be installed at any other suitable location. For example, the antenna 155 can be elsewhere within the internal chamber cavity 122, such as hanging underneath the lid 114 or mounted to the inner chamber surface 120, or can be installed external to the internal chamber cavity 122, such as at a roadside location proximate to the access chamber assembly 100, for example and without limitation. The monitoring node 130, the antenna 155, and any other components received within the internal chamber cavity 122 can be protected from undesirable external factors, such as dirt and moisture, heavy impacts, tampering, and the like, by the access chamber housing 110. In some aspects, the chamber lid 114 can be secured to the chamber liner 112 in such a way to prevent accidental or unauthorized removal of the chamber lid 114. Furthermore, the non-ferrous composite material of the chamber lid 114 can limit or prevent interference with signals sent by the antenna 155.

Figure 2:
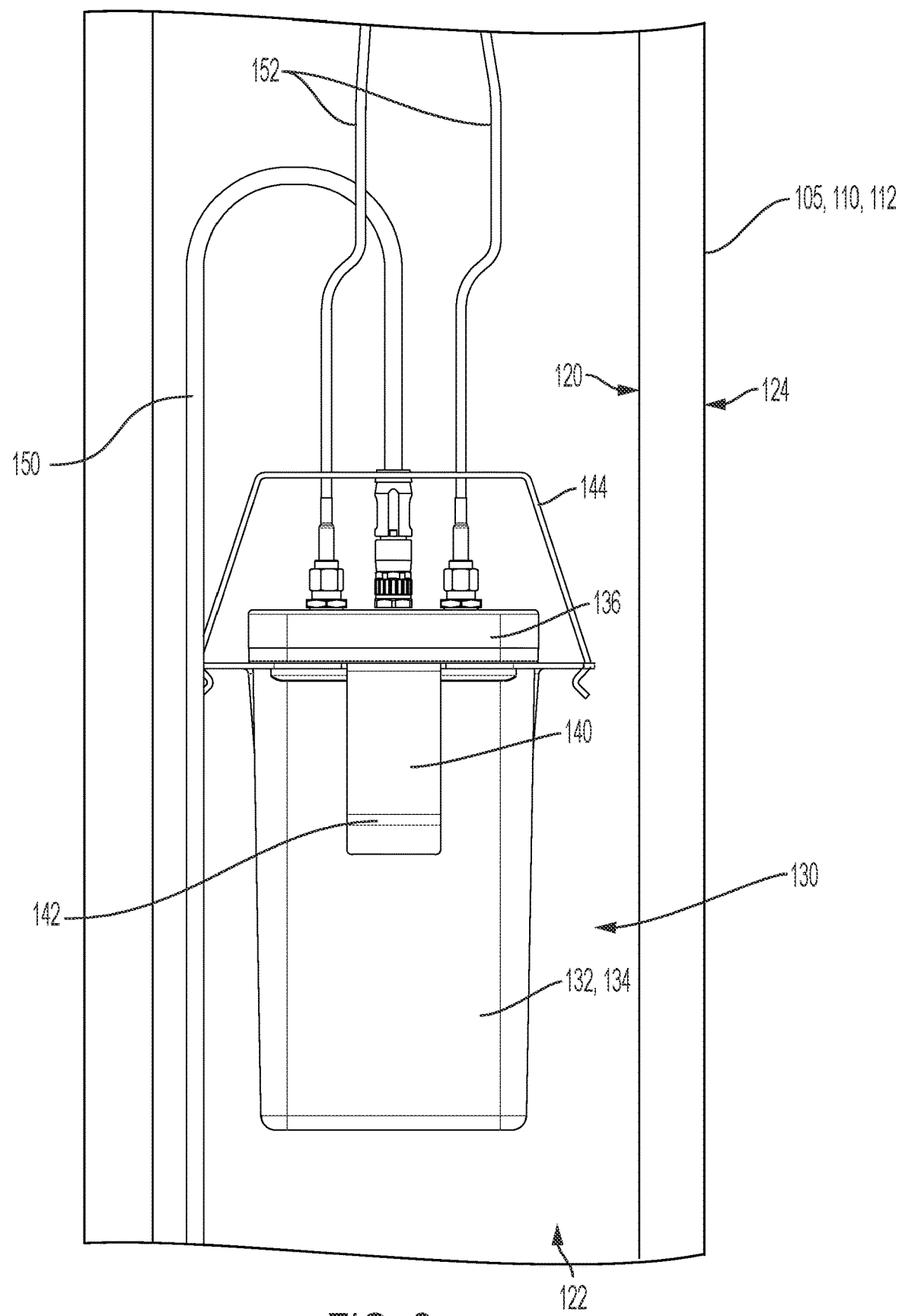
FIG. 2 is a side view of the monitoring node mounted within an access chamber housing of the access chamber assembly of FIG. 1, wherein the access chamber housing is illustrated as transparent.

Example aspects of the monitoring node 130 can comprise a node housing 132. The node housing 132 can comprise a node outer shell 134 and a node lid 136 removably coupled to the node outer shell 134. The various internal monitoring components 138 can be housed within an interior node cavity 135 of the node housing 132, such as the data processor, communication hardware, and a power source. The interior node cavity 135 can be defined by the node outer shell 134 and the node lid 136. The node mounting bracket 140 can be configured to engage and support the node housing 132 within the chamber cavity 122. Example aspects of the node mounting bracket 140 can be a spring-loaded node mounting bracket 140. For example, in the present aspect, the node mounting bracket 140 can comprise a pair of opposing spring legs 142 biased outward from the monitoring node 130 and configured to frictionally engage the inner chamber surface 120. Other aspects of the node mounting bracket 140 can comprise more or fewer spring legs 142. The node mounting bracket 140 can further comprise a bracket handle 144 in example aspects. The bracket handle 144 can extend upward from the monitoring node 130, relative to the orientation shown, and can be gripped by a user to facilitate inserting and removing the monitoring node 130 to and from the chamber cavity 122. Thus, in example aspects, the monitoring node 130 can be supported within the chamber cavity 122 at a depth that positions the bracket handle 144 to be manually accessible through the upper liner end 116. FIG. 2 illustrates the monitoring node 130 mounted within the chamber cavity 122, wherein the chamber liner 112 is shown as transparent.

Figure 3:
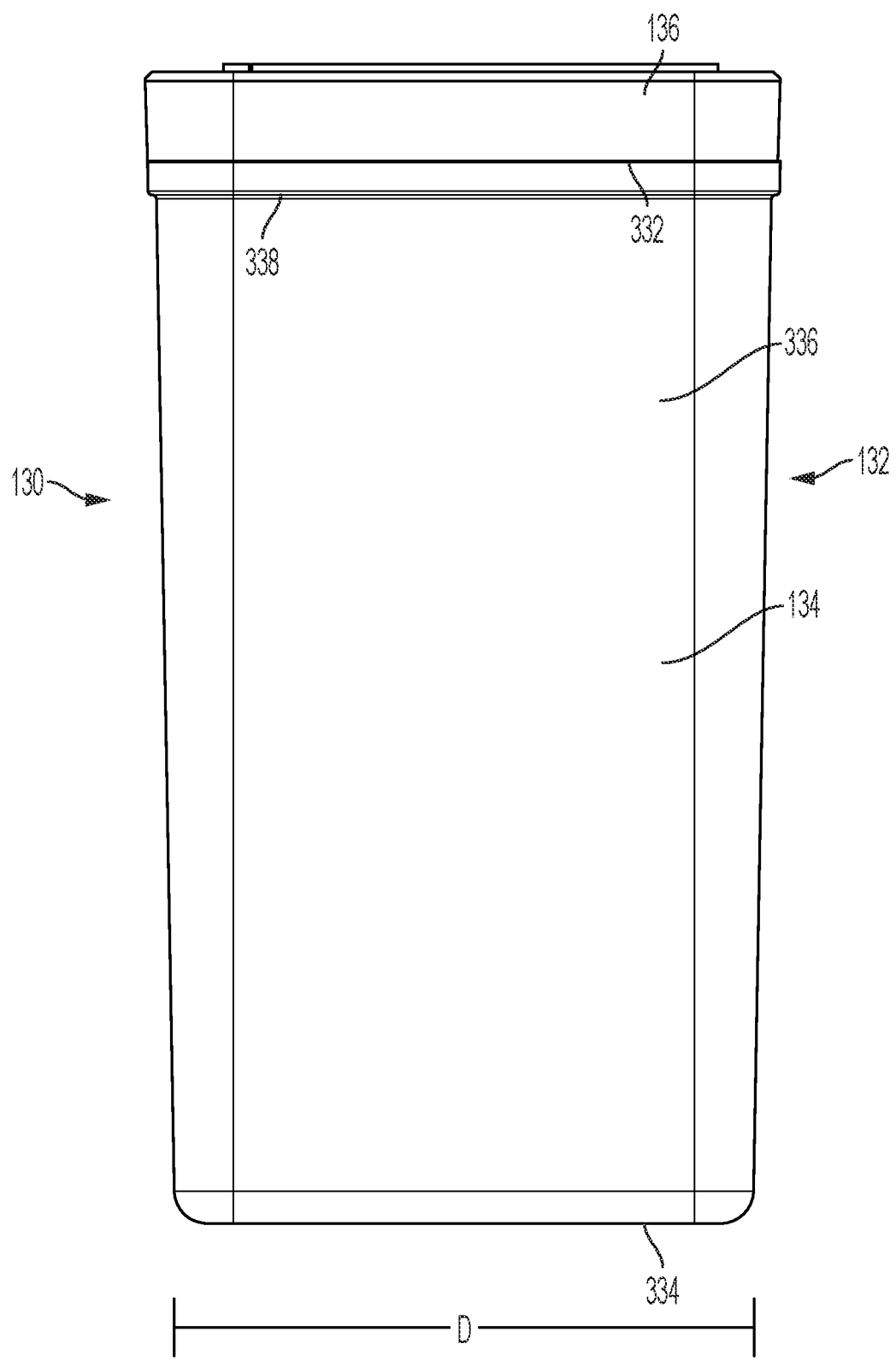
FIG. 3 is a side view of the monitoring node of FIG. 1.

FIG. 3 illustrates the monitoring node 130 according to an example aspect of the present disclosure. As shown, the monitoring node 130 can comprise the node housing 132, and the internal monitoring components 138 (shown in FIG. 1) of the monitoring node 130 can be stored within and protected by the node housing 132. The node housing 132 can comprise the node outer shell 134 and the node lid 136. The node outer shell can define an outer shell surface 336. In some aspects, a depth D and/or a width $W_1$ (shown in FIG. 9) of the node outer shell 134 can taper inward in a downward direction, relative to the orientation shown. For example, in the present aspect, both the depth D and the width $W_1$ of the node outer shell 134 can taper inward generally from an upper shell end 332 of the node outer shell 134 to a lower shell end 334 of the node outer shell 134 opposite the upper shell end 332. As shown, the node lid 136 can be mounted to the node outer shell 134 at the upper shell end 332 thereof. In example aspects, the node lid 136 can define one or more cable entry openings 836 (shown in FIG. 8) configured to receive the corresponding valve sensor cable 150 (shown in FIG. 1), antenna sensor cable 152 (shown in FIG. 1), or other cable therethrough. In other aspects, some or all of the cable entry openings 836 can be formed through the node outer shell 134.

In example aspects, the node outer shell 134 can define an outer lip 338 extending fully or partially about a periphery of the node outer shell 134. In the present aspect, the outer lip 338 can disposed proximate to the upper shell end 332 and can be oriented substantially parallel to the node lid 136. However, in other aspects, the outer lip 338 can be disposed elsewhere along the node outer shell 134. In some aspects, the outer lip 338 can be configured to engage the node mounting bracket 140 (shown in FIG. 1) to support the monitoring node 130 on the node mounting bracket 140. In other aspects, however, the outer lip 338 may not engage the node mounting bracket 140. For example, in some aspects, the lessening depth D and width $W_1$ of the node outer shell 134 towards the lower shell end 334 can allow the lower shell end 334 to be inserted through a bracket opening 442 (shown in FIG. 4) of the node mounting bracket 140, while the increasing depth D and width $W_1$ towards the upper shell end 332 can prohibit the monitoring node 130 from passing through the bracket opening 442, thereby mounting the monitoring node 130 on the node mounting bracket 140, as described in further detail below. That is, the depth D and width $W_1$ of the node outer shell 134 can be lesser than a corresponding depth D2 and width W3 of the bracket opening 442 at the lower shell end 334, but can be greater than the depth D2 and width W3 (both shown in FIG. 4) of the bracket opening 442 at the upper shell end 332 to prohibit the upper shell end 332 from passing through the bracket opening 442. Other aspects of the node outer shell 134 may not comprise the outer lip 338.

Figure 4:
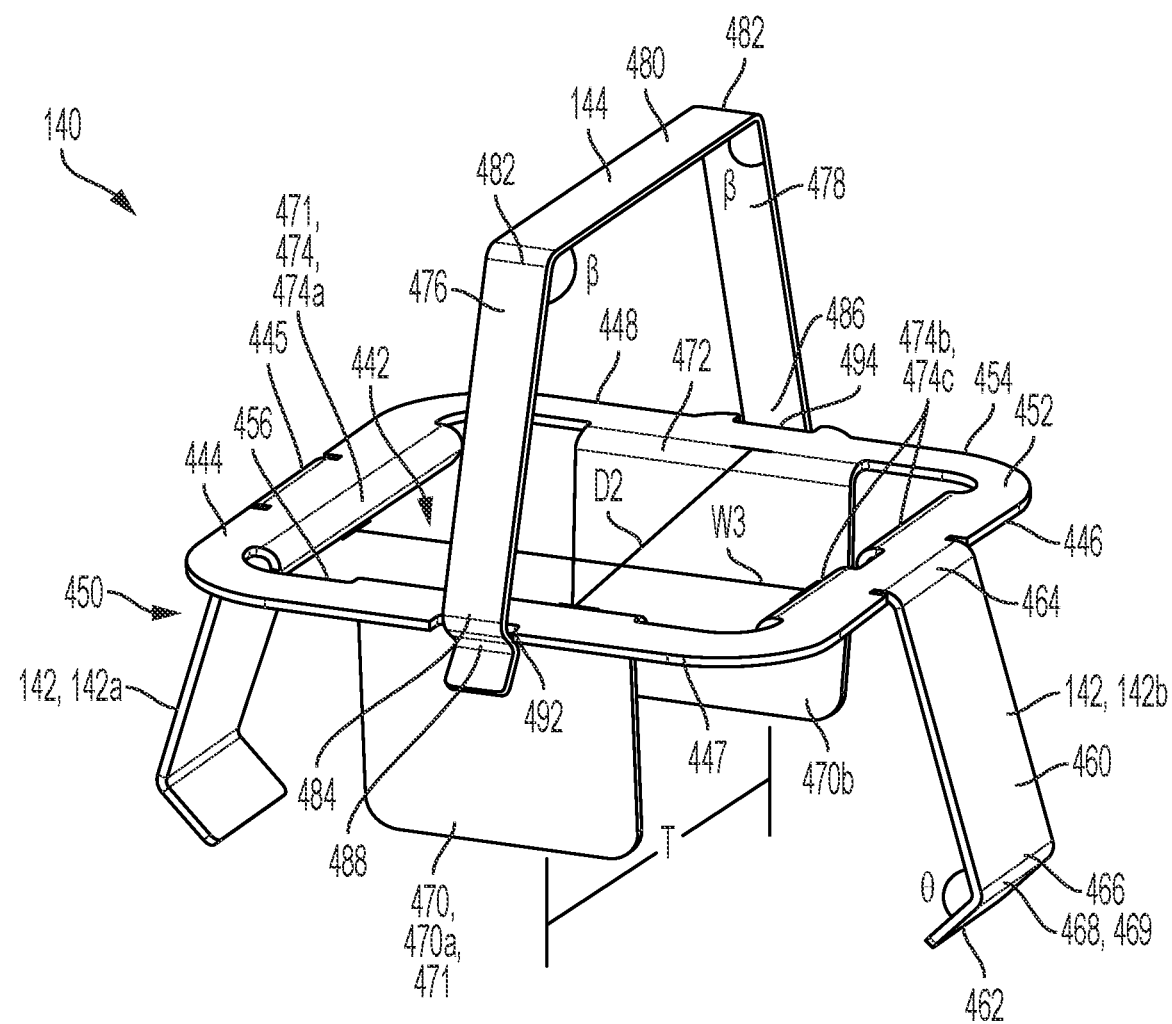
FIG. 4 is a perspective view of the node mounting bracket of FIG. 1.
Figure 5A:
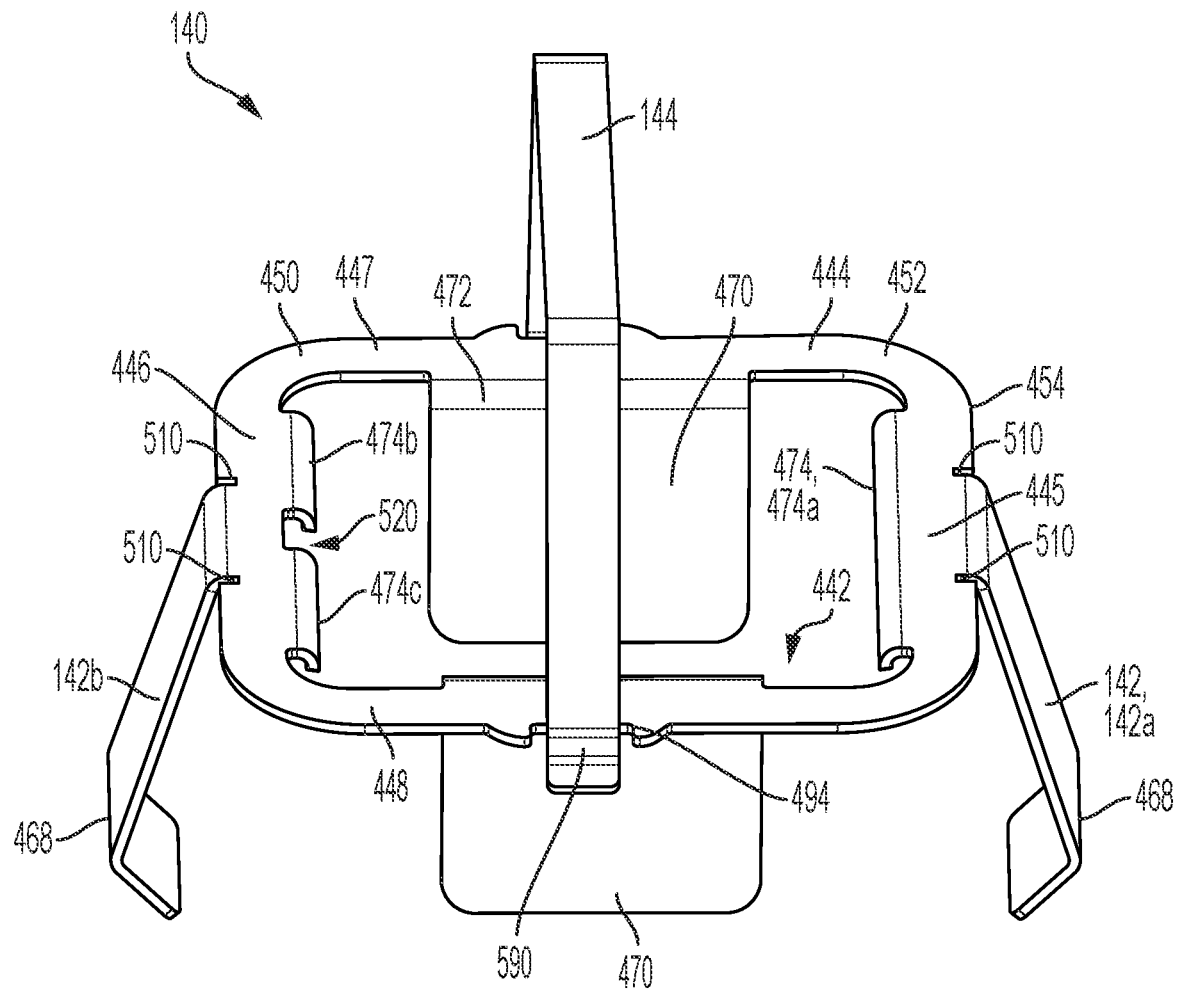
FIG. 5A is another perspective view of the node mounting bracket of FIG. 1.

FIGS. 4 and 5A illustrate perspective views of the node mounting bracket 140 according to an example aspect of the present disclosure. Referring to FIG. 4, the node mounting bracket 140 can comprise the pair of spring legs 142 and the bracket handle 144. In other aspects, the node mounting bracket 140 may not comprise the bracket handle 144. Furthermore, in other aspects, the node mounting bracket 140 can comprise more or fewer spring legs 142. Example aspects of the node mounting bracket 140 can further comprise a node support portion 444. The node support portion 444 can be configured to engage and support the monitoring node 130 (shown in FIG. 1) in some aspects. According to example aspects, the node support portion 444 can be formed monolithically (i.e., formed a singular component that constitutes a single material without joints or seams) with the spring legs 142, which together can define a bracket base 450 of the node mounting bracket 140. The spring legs 142 can extend outward from the node support portion 444, as shown. In some aspects, the bracket handle 144 can also be formed monolithically with the bracket base 450; however, in the present aspect, the bracket handle 144 can be formed separately from the bracket base 450 and coupled to the node support portion 444 thereof.

According to example aspects, the node mounting bracket 140 can comprise a material with suitable resiliency to allow the spring legs 142 to bend, as described above. In some aspects, the node mounting bracket 140 can comprise a metal material, such as aluminum, anodized aluminum, or steel (such as spring steel), for example and without limitation. In the present aspect, the bracket base 450 of the node mounting bracket 140 can be manufactured by laser cutting and forming (i.e., bending) sheet metal into the desired shape. In other aspects, the sheet metal can be stamped and formed into the desired shape. The bracket handle 144 can also be formed by bending sheet metal into the desired shape. In other aspects, the bracket base 450 of the node mounting bracket 140 can comprise any other material or combination of materials that can provide the spring legs 142 with a suitable resiliency and/or can be formed by any other suitable manufacturing technique known in the art. Moreover, the bracket handle 144 can be formed from any other suitable material or combination of materials. The bracket handle 144 can be formed from the same material(s) as the bracket base 450, or can be formed from a different material(s) than the bracket base 450.

Example aspects of the node support portion 444 of the bracket base 450 can define a support rim 452. The support rim 452 can define the bracket opening 442, and the bracket opening 442 can be configured to receive the node outer shell 134 (shown in FIG. 1) of the monitoring node 130 therethrough. In the present aspect, the bracket opening 442 can be sized and shaped as needed to suitably accommodate the size and shape of the node outer shell 134. In the present aspect, the node outer shell 134 can define a substantially rectangular cross-sectional shape, and the bracket opening 442 can be substantially rectangular in shape. The bracket opening 442 can define the width W3 and the depth D2, as shown. In other aspects, the node outer shell 134 can define any other suitable cross-sectional shape, such as cylindrical for example and without limitation, and the bracket opening 442 can define a corresponding shape, such as circular. The node support portion 444 can generally define a first side 445, a second side 446, a front end 447, and a rear end 448. A first spring leg 142a of the pair of spring legs 142 can extend from an outer rim edge 454 of the support rim 452 generally outward and downward at the first side 445 of the node support portion 444, relative to the orientation shown.

A second spring leg 142b of the pair of spring legs 142 can extend from the outer rim edge 454 of the support rim 452 generally outward and downward at the second side 446 of the node support portion 444, relative to the orientation shown. In other aspects, additional spring legs 142 can extend from the first side 445, the second side, 446, the front end 447, and/or the rear end 448 as desired.

In the present aspect, each of the spring legs 142 can define an upper leg portion 460 and a lower leg portion 462. The upper leg portion 460 can be elongated and can extend from the support rim 452 at a proximal leg end 464 of the upper leg portion 460. In some aspects, a relief notch 510 (shown in FIG. 5A) can extend into the outer rim edge 454 of the support rim 452 at either side of the proximal leg end 464 to facilitate bending the spring leg 142 relative to the support rim 452. The lower leg portion 462 can be shortened compared to the upper leg portion 460 and can extend from the upper leg portion 460 at a distal leg end 466 of the upper leg portion 460. That is, a length of the upper leg portion 460 can be greater than a length of the lower leg portion 462 in some aspects. The upper leg portion 460 can be angled generally outward and downward from the support rim 452, and the lower leg portion 462 can be angled generally inward and downward from the upper leg portion 460, such that an angle θ can be defined between the upper and lower leg portions 460,462 and such that the spring leg 142 can be substantially V-shaped (with one side of V-shape being elongated in the present aspect). In other aspects, the lengths and/or other dimensions of the upper leg portion 460 and the lower leg portion 462 can vary. In other aspects, the spring legs 142 may not comprise the lower leg portions 462. According to example aspects, a spring engagement region 468 of the spring leg 142 can be defined generally where the upper leg portion 460 meets the lower leg portion 462 at a joint or bend 469 in the spring leg 142, and the spring engagement region 468 of each spring leg 142 can be configured to frictionally engage the inner chamber surface 120 (shown in FIG. 1) of the chamber liner 112 (shown in FIG. 1).

Example aspects of the node support portion 444 can further comprise one or more node engagement portions 471 configured to engage the node outer shell 134. For example, the node engagement portions 471 can comprise one or more node engagement tabs 470 and one or more node engagement projections 474. A first node engagement tab 470a of the node engagement tabs 470 can extend from an inner rim edge 456 of the support rim 452 generally downwards at the front end 447 of the node support portion 444, relative to the orientation shown. A second node engagement tab 470b of the node engagement tabs 470 can extend from the inner rim edge 456 of the support rim 452 generally downwards at the rear end 448 of the node support portion 444, relative to the orientation shown. In some aspects, the node engagement tabs 470 can be directly connected to the inner rim edge 456. However, in the present aspect, the node support portion 444 can define a tab bridge 472 extending generally inward a short distance from the inner rim edge 456 at each of the first side 445 and the second side 446, and each of the node engagement tabs 470 can extend generally downward from the corresponding tab bridge 472. Thus, each of the node engagement tabs 470 can be inwardly offset from the support rim 452. Moreover, in some aspects, the node engagement tabs 470 can be angled slightly inward towards one another, as shown and described in further detail with respect to FIG. 6.

The node engagement tabs 470 can be configured to engage and grip the outer shell surface 336 (shown in FIG.

3) of the node outer shell 134 to help mount the monitoring node 130 on the node mounting bracket 140 and to aid in maintaining the vertical alignment of the monitoring node 130 within the chamber cavity 122 (shown in FIG. 1). As described above, example aspects of the node outer shell 134 can taper in depth D (shown in FIG. 3). According to example aspects, the node outer shell 134 can be inserted through the bracket opening 442 until the depth D of the node outer shell 134 between node engagement tabs 470 is about equal to or slightly greater than a distance T between the node engagement tabs 470. The node engagement tabs 470 can bias against the node outer shell 134 to hold the monitoring node 130 in place within the bracket opening 442 of the node mounting bracket 140. Additionally or alternatively, the outer lip 338 (shown in FIG. 3) of the node outer shell 134 can be configured to rest on the tab bridges 472 and/or the support rim 452 of the node mounting bracket 140 in some aspects to support the monitoring node 130 thereon.

In some aspects, the node support portion 444 can further comprise one or more node engagement projections 474 extending from the inner rim edge 456 of the support rim 452 generally inward and downward at each of the first side 445 and the second side 446, relative to the orientation shown. For example, in the present aspect, a first node engagement projection 474a can extend from the inner rim edge 456 at the first side 445 of the node support portion 444, and second and third node engagement projections 474b,c (as seen best in FIG. 5A) can extend from the inner rim edge 456 at the second side 446 of the node support portion 444. Like the tab bridges 472, each of the node engagement projections 474 can extend generally inward a short distance from the inner rim edge 456. Distal to the inner rim edge 456, each of the node engagement projections 474 can further extend generally downward a short distance. In some aspects, as shown, the node engagement projections 474 can be substantially curved or arcuate (as seen best in FIGS. 5A and 7). In other aspects, the node engagement projections 474 can be more angular. Along with the node engagement tabs 470, the node engagement projections 474 can be configured to engage and grip the outer shell surface 336 node outer shell 134 to retain the monitoring node 130 within the bracket opening 442 and thereby mount the monitoring node 130 on the node mounting bracket 140. Other aspects of the node support portion 444 can comprise more or fewer node engagement tabs 470 and/or node engagement projections 474. Additionally or alternatively, the outer lip 338 of the node outer shell 134 can further be configured to rest on the node engagement projections 474. However, in other aspects, the outer lip 338 may not engage the node support portion 444. Other aspects of the node support portion 444 may not comprise any of the tab bridges 472, the node engagement tabs 470, and/or the node engagement projections 474.

In example aspects, the bracket handle 144 can be coupled to the node support portion 444 of the bracket base 450. Specifically, in the present aspect, the bracket handle 144 can be coupled to the support rim 452 at the front end 447 of the node support portion 444 and the rear end 448 of the node support portion 444. In other aspects, the bracket handle 144 can be coupled to the support rim 452 at the first side 445 and the second side 446, or can be coupled to bracket base 450 at any other suitable location. As described above, in the present aspect, the bracket handle 144 can be formed separately from the bracket base 450 and coupled thereto; however, in other aspects, the bracket handle 144 can be formed monolithically with the bracket base 450.

Furthermore, in the present aspect, the bracket handle 144 can comprise the same material at the bracket base 450; however, in the other aspects, the bracket handle 144 and the bracket base 450 can comprise differing materials.

The bracket handle 144 can define an inverted U-shape in the orientation shown. For example, the bracket handle 144 can define a first handle member 476, a second handle member 478, and a handle crossmember 480 extending between proximal member ends 482 of the first and second handle members 476,478. While the first handle member 476, the second handle member 478, and the handle crossmember 480 are substantially straight and the joints formed therebetween are substantially angular in the present aspect, the bracket handle 144 and/or the joints thereof can be substantially curved in other aspects. The handle crossmember 480 can be disposed above the bracket base 450 in the illustrated upright orientation. In other aspects, the bracket handle 144 can define any other suitable shape. A first distal portion 484 of the first handle member 476 can engage a front handle notch 492 formed in the outer rim edge 454 of the support rim 452 at the front end 447 of the node support portion 444. A second distal portion 486 of the second handle member 478 opposite the first distal portion 484 can engage a rear handle notch 494 formed in the outer rim edge 454 at the rear end 448.

The engagement of the first distal portion 484 and the second distal portion 486 of the bracket handle 144 with the front handle notch 492 and the rear handle notch 494 of the support rim 452, respectively, can prevent lateral and forward/rearward movement of the bracket handle 144 relative to the bracket base 450. In example aspects, each of the first and second handle members 476,478 can be angled downward and bent slightly outward from the handle crossmember 480 when the bracket handle 144 is mounted to the bracket base 450, such that an obtuse angle θ is defined between each of the each of the first and second handle members 476,478 and the handle crossmember 480. In other aspects, the angle θ can be about 90° or can be acute.

According to example aspects, the bracket handle 144 can comprise a resilient material, such as a resilient metal material as described above. To couple the bracket handle 144 to the bracket base 450, the first distal portion 484 and the second distal portion 486 can be positioned adjacent to the corresponding front end 447 and rear end 448 of the node support portion 444, respectively, and the first and second handle members 476,478 can be forced apart and bent relative to the handle crossmember 480 by pushing angled tabs 684,686 (shown in FIG. 6) of the first and second distal portions 484,486 downward against the support rim 452 (e.g., manually or with a tool). Once the angled tabs 684,686 are pushed downward past the support rim 452, the downward force can be released, and the resiliency of the bracket handle 144 can bias the first and second distal portions 484,486 back towards one another to frictionally engage the front and rear handle notches 492,494 of the support rim 452. Furthermore, in example aspects, a first inward portion 488 of the first distal portion 484 of the bracket handle 144 can extend substantially inward beneath the support rim 452 at the front end 447, and a second inward portion 590 (shown in FIG. 5A) of the second distal portion 486 of the bracket handle 144 can extend substantially inward beneath the support rim 452 at the rear end 448. The first and second inward portions 488,590 can be configured to catch on the support rim 452 to prevent the bracket handle 144 from disengaging the bracket base 450.

Referring to FIG. 5A, one of the relief notches 510 can extend into the outer rim edge 454 of the support rim 452 at either side of each spring leg 142. The relief notches 510, along with the resiliency of bracket base 450, can facilitate bending the spring legs 142 inward relative to the support rim 452 when mounting the node mounting bracket 140 within the access chamber housing 110 (shown in FIG. 1). Additionally, each of the node engagement projections 474 of the node support portion 444 are fully visible in FIG. 5A. The node engagement projections 474 can comprise the first, second, and third node engagement projections 474a,b,c. The first node engagement projection 474a can be disposed at the first side 445 of the node support portion 444 and the second and third node engagement projections 474b,c can be disposed at the second side 446 of the node support portion 444. A small gap 520 can be defined between the second and third node engagement projections 474b,c, as shown, which can form an alignment notch 520. In other aspects, the gap 520 may not be present, and the second and third node engagement projections 474b,c can be joined to define a single node engagement projection 474. Other aspects of the node mounting bracket 140 can comprise more or fewer node engagement projections 474.

Figure 5B:
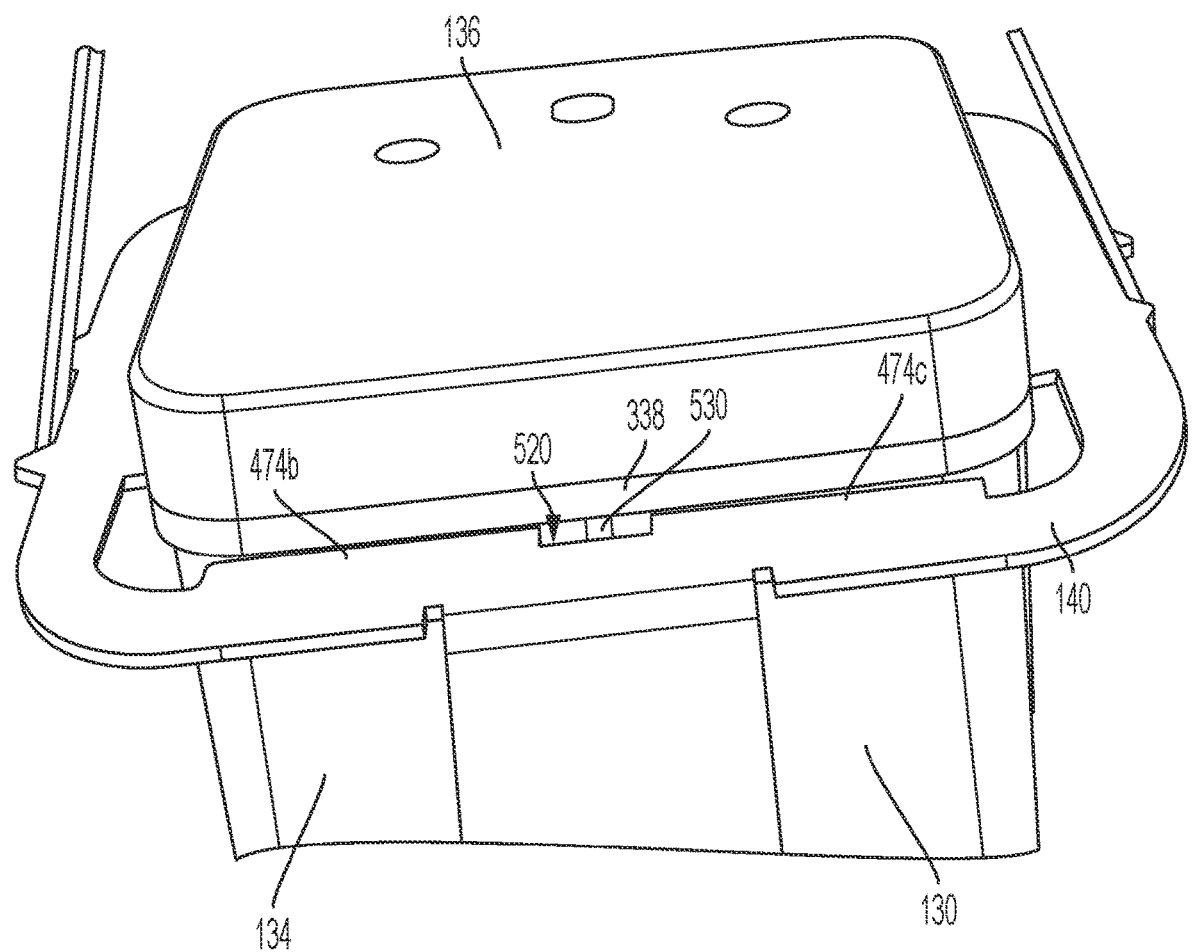
FIG. 5B is a detail view of the monitoring node of FIG. 1 assembled with the node mounting bracket of FIG. 1.

As shown in FIG. 5B, the monitoring node 130 can define an outer alignment projection 530 configured to align the node outer shell with the node lid 136. In the present aspect, the outer alignment projection 530 can extend substantially downward from the outer lip 338 and outward from the node outer shell 134. The outer alignment projection 530 can engage the alignment notch 520 formed between the second and third node engagement projections 474b,c when the monitoring node 130 is assembled with the node mounting bracket 140 to ensure the monitoring node 130 is properly aligned with and supported on the node mounting bracket 140. In other aspects, the outer alignment projection 530 can be formed elsewhere on the monitoring node 130. In other aspects, the monitoring node 130 may not comprise the outer alignment projection 530.

Figure 6:
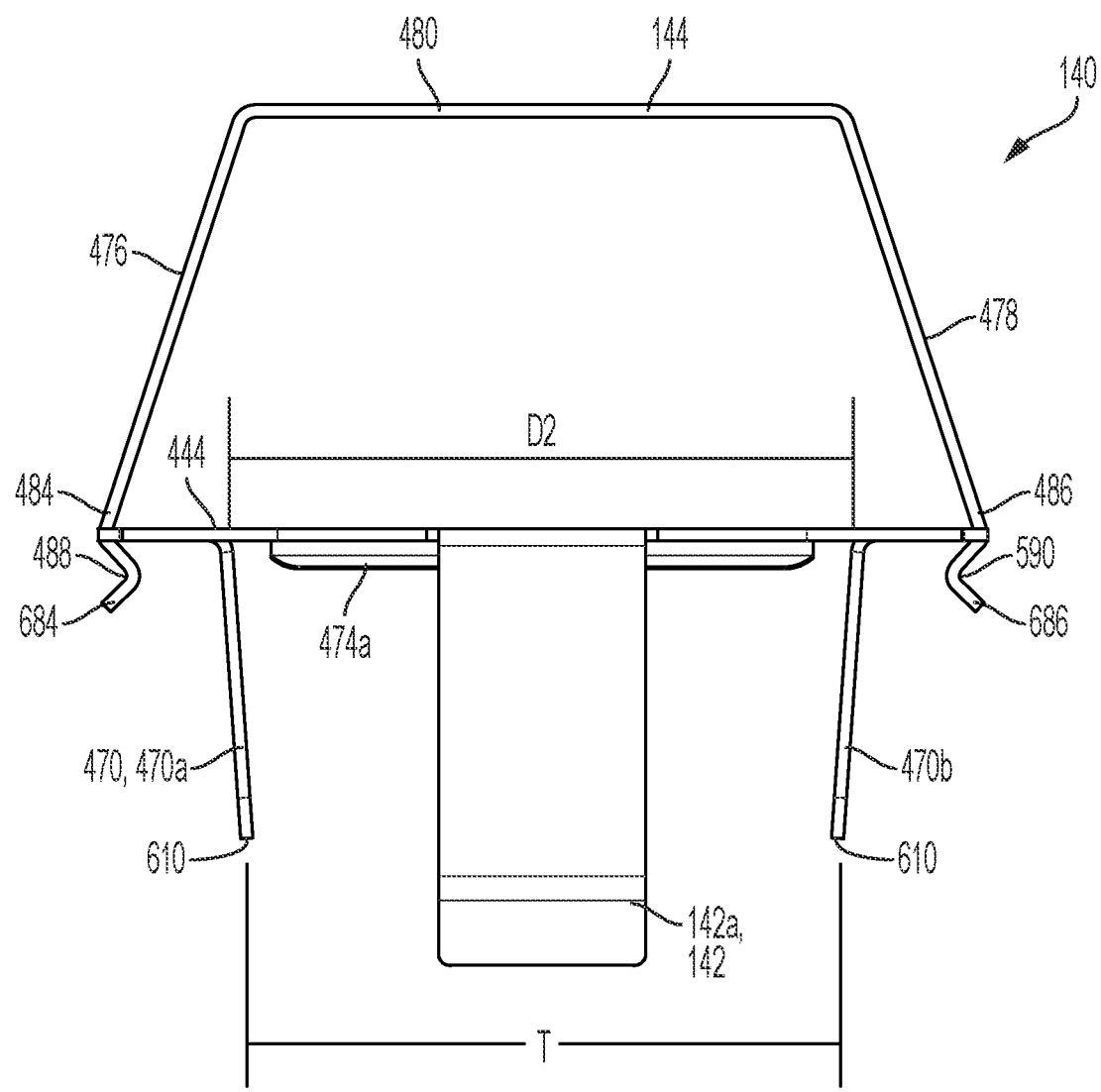
FIG. 6 is a side view of the node mounting bracket of FIG. 1.
Figure 7:
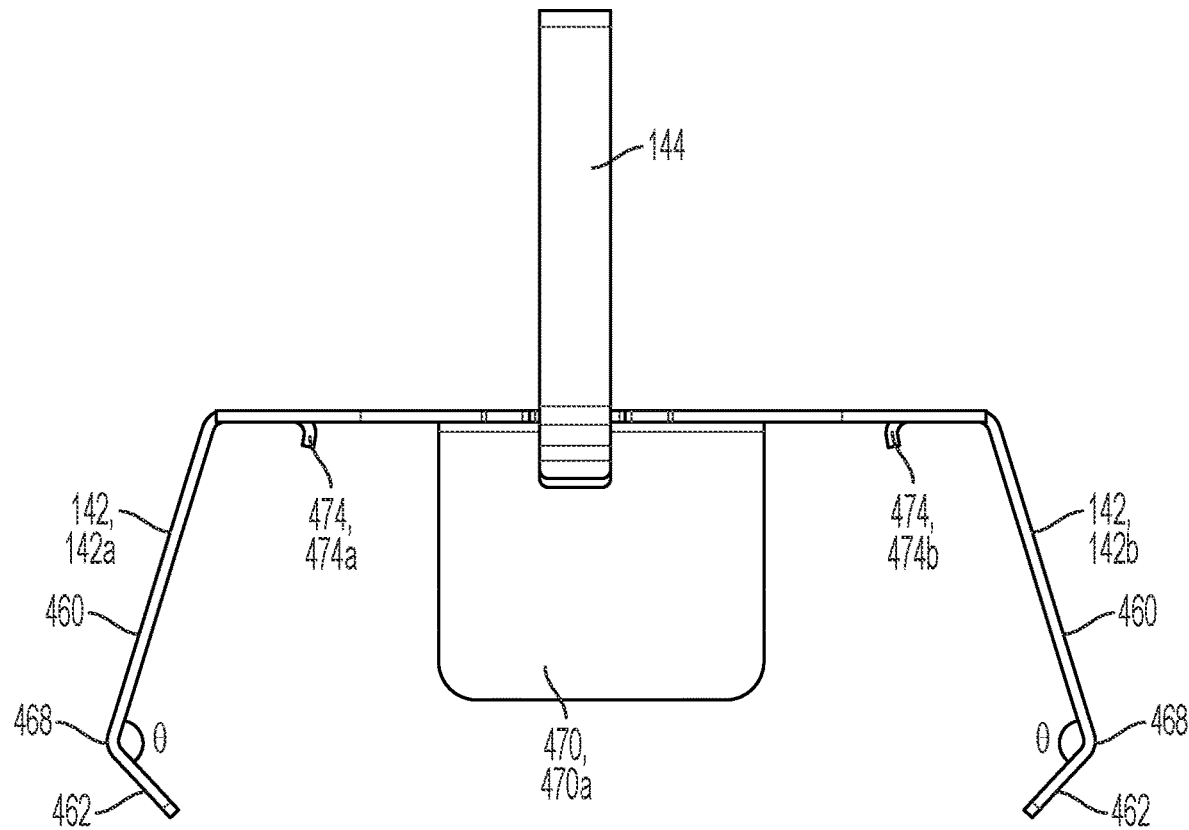
FIG. 7 is a front view of the node mounting bracket of FIG. 1.

FIGS. 6 and 7 illustrate side and front views of the node mounting bracket 140, respectively. As shown in FIG. 6, in some aspects, each of the node engagement tabs 470 can be angled slightly inward towards one another, which may generally conform to the tapering depth D (shown in FIG. 3) of the node outer shell 134 (shown in FIG. 1) when the monitoring node 130 (shown in FIG. 1) is mounted within the bracket opening 442 (shown in FIG. 4). Thus, the depth D2 of the bracket opening 442 at the node support portion 444 can be greater than the distance T between the node engagement tabs 470 at distal tab ends 610 thereof. The distal tab ends 610 can free ends in some aspects, as shown, but may not be free ends in other aspects. In some aspects, the monitoring node 130 can be pushed through the bracket opening 442 with a suitable force such that the node outer shell 134 can bias the node engagement tabs 470 slightly outward. The resiliency of the node engagement tabs 470 can allow the node engagement tabs 470 to push back against the node outer shell 134, thereby frictionally engaging the node engagement tabs 470 with the node outer shell 134. In other aspects, the node engagement tabs 470 can extend straight downward and can be substantially parallel with one another. FIG. 7 illustrates the angle $\theta$ can be defined between the upper and lower leg portions 460,462 of each spring leg 142. The angle $\theta$ can be obtuse in the present aspect; however, the angle $\theta$ can be about orthogonal or acute in other aspects. FIG. 7 also illustrates the arcuate shape of the node engagement projections 474.

Figure 8:
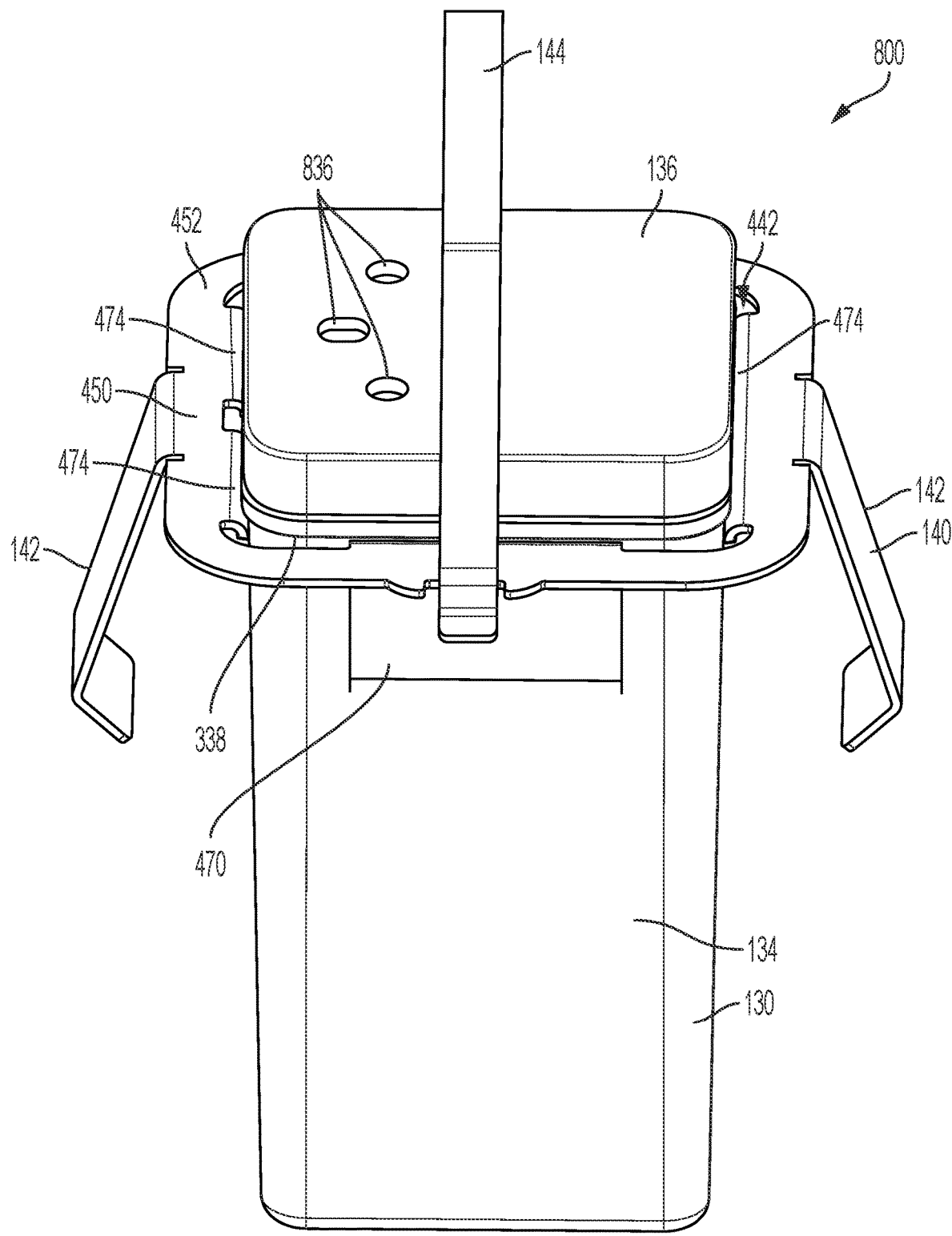
FIG. 8 is a perspective view of a node assembly comprising the node mounting bracket of FIG. 1 assembled with the monitoring node of FIG. 1.
Figure 9:
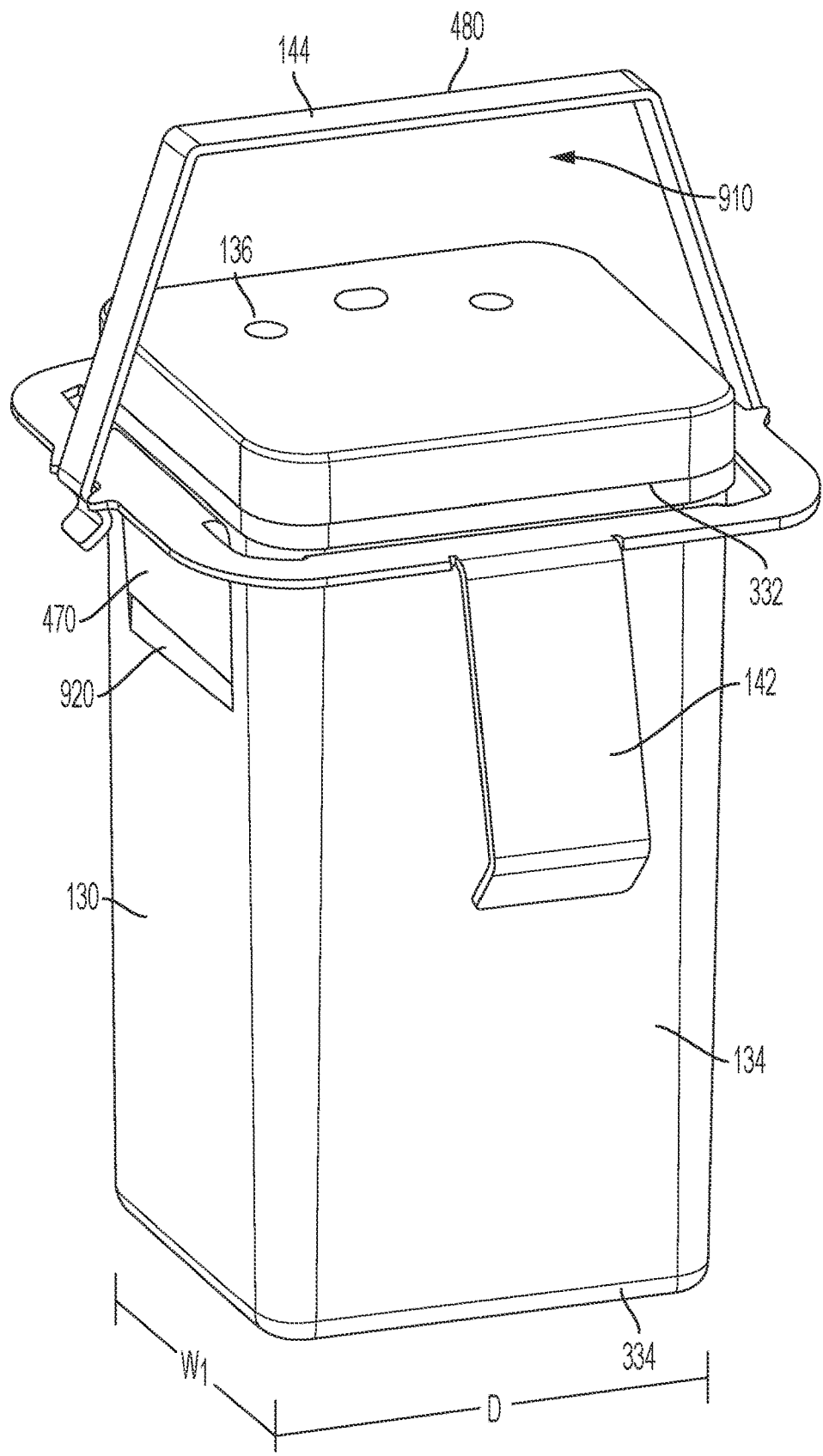
FIG. 9 is another perspective view of the node assembly of FIG. 8.

FIGS. 8 and 9 illustrate perspective views of a node assembly 800 comprising the monitoring node 130 and the node mounting bracket 140. As shown, the node outer shell 134 of the monitoring node 130 can be received through the bracket opening 442 of the node mounting bracket 140. Each of the node engagement tabs 470 and the node engagement projections 474 can extend inward from the support rim 452 of the node mounting bracket 140 and can engage the node outer shell 134 to retain the monitoring node 130 within the bracket opening 442. As described above, the node engagement tabs 470 can also aid in maintaining the vertical orientation of the monitoring node 130. In some aspects, as shown, each of the node engagement tabs 470 can be configured to nest into a corresponding tab notch 920 or tab indentation formed in the node outer shell 134. The tab notch 920 can aid in locating and preventing movement of the node engagement tab 470 relative to the node outer shell 134. However, other aspects of the monitoring node 130 may not comprise the tab notches 920, such as the aspect of the monitoring node shown in FIG. 10. In some aspects, the outer lip 338 of the node outer shell 134 can rest on the support rim 452, the tab bridges 472 (shown in FIG. 4), and/or the node engagement projections 474 to further support the monitoring node 130 on the node mounting bracket 140 and prevent the node outer shell 134 from passing through the bracket opening 442. In other aspects, however, the outer lip 338 may not rest on the support rim 452, the tab bridges 472, and/or the node engagement projections 474, and the outer lip 338 can be disposed vertically above the node support portion 444. Other aspects of the node assembly 800 may not comprise the outer lip 338, the tab bridges 472 and/or the node engagement projections 474.

The node mounting bracket 140 can further comprise the spring legs 142 extending generally outward and downward from the support rim 452. The spring legs 142 can be configured to resiliently deform inwards towards the monitoring node 130 during installation of the node assembly 800 within the access chamber housing 110 (shown in FIG. 1). Additionally, the node mounting bracket 140 can comprise the bracket handle 144 coupled to the bracket base 450. The bracket handle 144 can extend upward from the support rim 452 and over the node lid 136 of the monitoring node 130. As shown in FIG. 9, a clearance space 910 can be defined between the handle crossmember 480 and the node lid 136, such that a suitable clearance is provided for a user to grip the handle crossmember 480. The user can grip the handle crossmember 480 to facilitate inserting the node assembly 800 into the access chamber housing 110 and/or removing the node assembly 800 from the access chamber housing 110. The clearance space 910 can also provide a suitable clearance for attaching and removing the node lid 136 to and from the node outer shell 134 without needing to remove or adjust the bracket handle 144. FIG. 9 also illustrates the depth D and the width $W_1$ of the node outer shell 134, which can taper slightly inward from the upper shell end 332 thereof to the lower shell end 334 thereof in example aspects. In other aspects, however, the node outer shell 134 may not be tapered.

Figure 10:
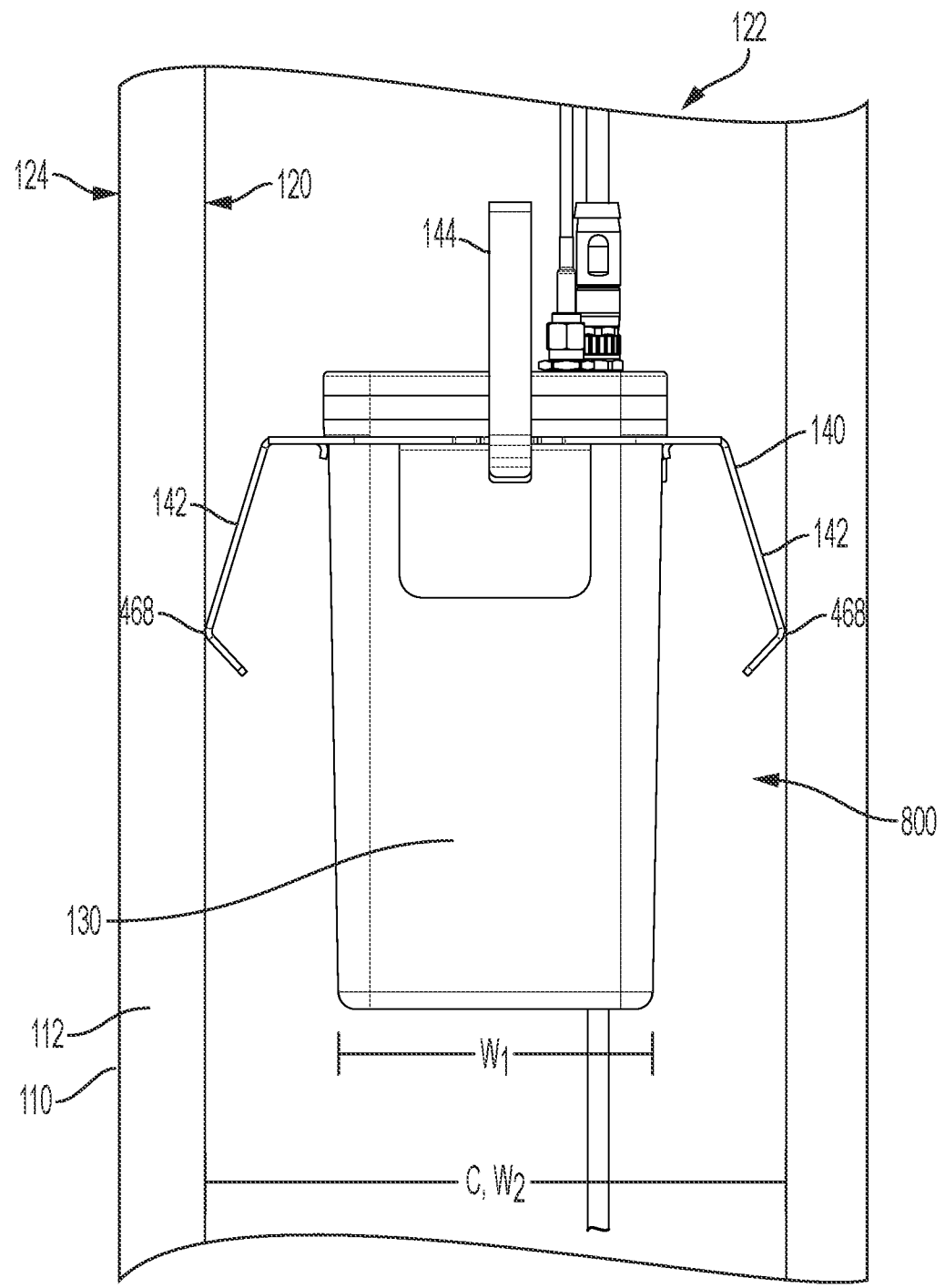
FIG. 10 is a front view of the node assembly of FIG. 8 mounted within the access chamber housing according to another example aspect of the disclosure, wherein the access chamber housing is illustrated as transparent.

FIG. 10 illustrates the node assembly 800 mounted within chamber cavity 122 of the access chamber housing 110, wherein the chamber liner 112 is illustrated as transparent for visibility into the chamber cavity 122. As shown, the node assembly 800 can be received within the chamber cavity 122 with the monitoring node 130 in a substantially vertical orientation. In other aspects, the monitoring node 130 may be oriented in any other suitable orientation. The width $W_1$ and the depth D (shown in FIG. 3) of the monitoring node 130 can be less than a diameter C or width of the chamber cavity 122. However, a width W2 defined between the spring engagement regions 468 of the spring legs 142 can be greater than the diameter C or width of the chamber cavity 122 in the natural, outwardly biased orientation of the spring legs 142. As such, when the node assembly 800 is mounted within the chamber cavity 122, the spring legs 142 can be forced inward by the inner chamber surface 120, thereby reducing the width W2 between the spring engagement regions 468. The resiliency of the spring legs 142 can bias the spring engagement regions 468 outward against the inner chamber surface 120, and the node assembly 800 can be mounted in place within the chamber cavity 122 by the frictional engagement between the spring legs 142 and the inner chamber surface 120. Thus, when the node assembly 300 is mounted within the chamber cavity 122, the width W2 defined between the spring engagement regions 468 can be equal to or about equal to the diameter C or width of the chamber cavity 122, as shown.

Thus, in example aspects, a method of mounting a node assembly 800 within an access chamber housing 110 can comprise forcing the resilient spring legs 142 of the node mounting bracket 140 inward to reduce the width W2 between the spring engagement regions 468 and inserting the node assembly 800 into the chamber cavity 122 of the access chamber housing 110. The resilient spring legs 142 can be forced inward manually or with a tool, for example and without limitation. The method can further comprise releasing the resilient spring legs 142 and biasing the resilient spring legs 142 outward to frictionally engage the resilient spring legs 142 with the inner chamber surface 120 of the chamber liner 112. In other aspects, the resilient spring legs 142 may not be forced inward manually or with a tool, but rather can be forced inward by the inner chamber surface 120 as the node assembly 800 is pushed downward into the chamber cavity 122. Example aspects of the method can further comprising removing the node assembly 800 from the access chamber housing 110. Removing the node assembly 800 from the access chamber housing 110 can comprise a user reaching into the chamber cavity 122, gripping the bracket handle 144 of the node mounting bracket 140, and pulling the node assembly 800 out of the chamber cavity 122. In other aspects, the bracket handle 144 can be engaged by a tool, such as a hooked retrieval pole, to remove the node assembly 800 from the chamber cavity 122.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A node assembly mountable within an access chamber, the node assembly comprising:
    a node mounting bracket comprising a spring leg and defining a bracket opening, the spring leg configured to frictionally engage an inner chamber surface of the access chamber; and
    a monitoring node received through the bracket opening and supported by the node mounting bracket.

2. The node assembly of claim 1, wherein the monitoring node comprises a node outer shell at least partially defining an interior node cavity, and wherein the node mounting bracket engages an outer shell surface of the node outer shell.

3. The node assembly of claim 2, wherein:
    the monitoring node further comprises a node lid removably coupled to the node outer shell;
    the node lid further defines the interior node cavity;
    a cable entry opening is formed through one of the node lid and the node outer shell; and
    the node assembly further comprises an antenna sensor cable extending through the cable entry opening and configured to couple the node assembly to an antenna.

4. The node assembly of claim 2, wherein the node outer shell defines an upper shell end and a lower shell end, and wherein at least one of a width and a depth of the node outer shell tapers inward in a direction from the upper shell end to the lower shell end to facilitate receiving the monitoring node through the bracket opening.

5. The node assembly of claim 2, wherein:
    the node mounting bracket comprises a node support portion defining an inner edge;
    the spring leg comprises a resilient material and extends substantially outward from the node support portion;
    the inner edge defines the bracket opening; and
    the node support portion comprises a node engagement portion extending into the bracket opening from the inner edge and configured grip the outer node shell to prevent the monitoring node from passing through the bracket opening.

6. The node assembly of claim 5, wherein:
    the node engagement portion is one of a plurality of node engagement portions;
    the plurality of node engagement portions comprise a first node engagement tab and a second node engagement tab;
    the first node engagement tab extends substantially downward from the inner edge at a first end of the node support portion;
    the second node engagement tab extends substantially downward from the inner edge at a second end of the node support portion opposite the first end; and
    each of the first and second node engagement tabs engage the node outer shell.

7. The node assembly of claim 6, wherein:
each of the first and second node engagement tabs define a first tab end coupled to the node engagement portion and a second tab end distal to the first tab end;
each of the first and second node engagement tabs are angled into the bracket opening substantially from first tab end to the second tab end; and
each of the first and second node engagement tabs comprise a resilient material and are biased inward to grip the node outer shell.

8. The node assembly of claim 6, wherein:
the plurality of node engagement portions further comprise a first node engagement projection and a second node engagement projection;
the first node engagement projection extends into the bracket opening from the inner edge at a first side of the node support portion;
the second node engagement projection extends into the bracket opening from the inner edge at a second side of the node support portion opposite the first side; and
each of the first node engagement projection and the second node engagement projection engages the node outer shell.

9. The node assembly of claim 5, wherein:
the node support portion comprises a support rim;
the support rim defines the inner edge and surrounds the bracket opening;
the node outer shell defines an outer lip; and
the outer lip is supported on at least one of the support rim and the node engagement portion.

10. The node assembly of claim 2, wherein:
the monitoring node comprises an alignment projection extending outward from the outer shell surface of the node outer shell;
the node mounting bracket comprises an alignment notch; and
the alignment projection can engage the alignment notch to properly align the monitoring node on the node mounting bracket.

11. The node assembly of claim 1, wherein:
the spring leg comprises a resilient material and extends substantially outward and downward from a node support portion of the node mounting bracket;
the spring leg comprises a first leg portion and a spring engagement region;
the first leg portion defining a proximal leg end coupled to an outer edge of the node support portion and a distal leg end opposite the proximal leg end; and
the spring engagement region is disposed proximate to the distal leg end and is configured to frictionally engage the inner chamber surface.

12. The node assembly of claim 11, wherein the spring leg further comprises a second leg portion extending substantially inward and downward from the spring engagement region.

13. The node assembly of claim 12, wherein the spring leg is substantially V-shaped, and wherein a first leg length the first leg portion is greater than a second leg length of the second leg portion.

14. The node assembly of claim 11, wherein a relief notch extends into the outer edge of the node support portion adjacent to the spring leg to facilitate bending the spring leg at the outer edge.

15. The node assembly of claim 11, wherein:
the spring leg is a first spring leg extending from the outer edge at a first side of the node support portion;
the node mounting bracket further comprises a second spring leg extending from the outer edge at a second side of the node support portion opposite the first side;
the spring engagement region is a first spring engagement region; and
the second spring leg comprises a second spring engagement region configured to frictionally engage the inner chamber surface.

16. The node assembly of claim 1, wherein the node mounting bracket further comprises a handle, and wherein the handle comprises:
a first handle member extending substantially upward from a first end of a node support portion of the node mounting bracket;
a second handle member extending substantially upward from a second end of the node support portion opposite the first end; and
a handle crossmember extending between the first handle member and the second handle member and over the node support portion.

17. The node assembly of claim 16, wherein:
the handle comprises a resilient material;
each of the first handle member and the second handle member are bent outward relative to the handle crossmember; and
each of the first handle member and the second handle member frictionally engage the node support portion to couple the handle to the node support portion.

18. The node assembly of claim 17, wherein:
the node support portion defines a first handle notch at the first end and a second handle notch at the second end;
a first distal portion of the first handle member engages the first handle notch; and
a second distal portion of the second handle member engages the second handle notch.

19. The node assembly of claim 18, wherein:
each of the first handle notch and the second handle notch are formed in a support rim of the node support portion;
the first distal portion of the first handle member defines a first inward portion extending inward beneath the support rim;
the second distal portion of the second handle member defines a second inward portion extending inward beneath the support rim; and
each of the first inward portion and the second inward portion are configured to catch on the support rim to prevent the handle from disengaging the node support portion.

20. A method of mounting a monitoring node within an access chamber comprising:
supporting the monitoring node on a node mounting bracket, wherein the node mounting bracket comprises a pair of resilient spring legs, and wherein the monitoring node and the node mounting bracket together define a node assembly;
forcing the pair of resilient spring legs inward;
receiving the node assembly within a chamber cavity of the access chamber; and
frictionally engaging the pair of resilient spring legs with an inner chamber surface of the access chamber.

21. The method of claim 20, wherein each of the pair of resilient spring legs comprises a spring engagement region frictionally engaging the inner chamber surface, and wherein forcing the pair of resilient spring legs inward reduces a width between the spring engagement regions.

22. The method of claim 21, wherein frictionally engaging the pair of resilient spring legs with an inner chamber surface of the access chamber comprises allowing the pair of resilient spring legs to be biased naturally outward.

23. The method of claim 20, further comprising removing the node assembly from the access chamber, and wherein removing the node assembly comprises engaging a bracket handle of the node mounting bracket within the chamber cavity and pulling the node assembly out of the chamber cavity.

\* \* \* \* \*